United States Patent [19]

Moon

[11] Patent Number: 5,668,981
[45] Date of Patent: Sep. 16, 1997

[54] APPARATUS HAVING RADIATING NOISE DAMPING MEANS FOR CONTROLLING POWER APPLIANCES

[75] Inventor: Hong-Kweon Moon, Kyongki-Do, Rep. of Korea

[73] Assignee: Samsung Electro-Mechanics Co., Ltd., Kyongki-do, Rep. of Korea

[21] Appl. No.: 505,022

[22] Filed: Jul. 21, 1995

[30] Foreign Application Priority Data

Jul. 22, 1994 [KR] Rep. of Korea ............... 1994-18276

[51] Int. Cl.⁶ .................................................. G06F 1/04
[52] U.S. Cl. ................................................... 395/559
[58] Field of Search ............................. 395/550, 559, 395/555; 331/175, 182

[56] References Cited

FOREIGN PATENT DOCUMENTS 5-259998  10/1993  Japan .
6-13993   1/1994   Japan .

*Primary Examiner*—Thomas M. Heckler
*Attorney, Agent, or Firm*—Lowe, Price, LeBlanc & Becker

[57] ABSTRACT

An apparatus having a radiating noise damping means for controlling power appliances is disclosed, in which signal confusion disorders caused to adjacent circuits by an overlapping of the electromagnetic waves from peripheral devices such as a memory and a crystal oscillating circuit are prevented. A crystal oscillator CT1 and a level resistor R1 are connected in parallel to external terminals X1 and X2 of the microprocessor 1. Further, a damping resistor R2 is connected in series with the crystal oscillator CT1 and the level resistor R1, thereby damping the oscillating signal level, and alleviating the radiating noise.

3 Claims, 5 Drawing Sheets

APPARATUS HAVING RADIATING NOISE DAMPING MEANS FOR CONTROLLING POWER APPLIANCES

FIELD OF THE INVENTION

The present invention relates to an apparatus having a radiating noise damping means for controlling power appliances, in which signal confusion disorders caused to adjacent circuits by an overlapping of the electromagnetic waves from peripheral devices such as a memory and a crystal oscillating circuit (for furnishing clock signals to a micro-processor) are prevented.

DESCRIPTION OF THE PRIOR ART

Generally, an electronic circuit is provided with a microprocessor for controlling the related circuits. This microprocessor generates various control signals based on a predetermined clock frequency. The clock signals are obtained from an oscillating circuit which is separately installed and connected to an external terminal of the microprocessor.

FIG. 1 illustrates a conventional crystal oscillating circuit which is connected to the microprocessor.

As shown in this drawing, a resistor R1 and a crystal oscillator CT1 are connected in parallel to external terminals X1 and X2 of a microprocessor 1, and capacitors C1 and C2 are connected between the eternal terminals X1 and X2 and the ground.

The resistor R1 is for adjusting the level of the crystal oscillator CT1, and the capacitors C1 and C2 bypasses the noise components.

As shown in FIG. 2A, the crystal oscillator T1 is expressed in a serial RLC equivalence circuit, and LoCoRo is an equivalence circuit of the mechanical oscillations of the crystal oscillator CT1, while C indicates electrical capacitance between storage electrodes.

FIG. 2B illustrates a detailed circuit in which an oscillating circuit 1a of the microprocessor 1 and the crystal oscillator CT1 are used. In this circuit, instead of a coil L of the Colpitts oscillating circuit, a crystal oscillator X is used.

Oscillation signals of the oscillator 1a are converted into clock pulse signals $\phi$ by a clock generator 1b to be supplied into the microprocessor 1.

The frequency which is outputted through an oscillation terminal is 1–10 MHz which corresponds to the radio frequency, and therefore, the terminals X1 and X2 which are connected to the microprocessor and the crystal oscillator CT1 generate radio frequency signals (RF signals) which are radiated into the air.

The RF signals thus radiated can affect other signal processing circuits as noise, and therefore, a ground pattern is disposed on the other face of a printed circuit board, so that the RF signals would be shielded. Or a shielding metal film is disposed on the portion from which the RF signals are radiated, thereby shielding the RF signals. However, the both-side printed circuit board is more expensive than a single side circuit board, and therefore, in this case, the manufacturing cost is increased.

Even if the microprocessor is singly used, or it is used together with peripheral devices, when the peripheral devices do not use the clock signals, there occurs no overlapping of the signals due to the external radiation of the RF signals caused by the clock signals. Therefore, the intensity of the RF signals is such that it does not affect other signal processing circuits.

However, in order to meet the desires of the users, if the microprocessor and a memory device for storing control programs and data are used, the clock signals are supplied not only into the microprocessor but also to an external memory 2, so that the clock signals can be used as timing signals for the data input and output. Under this condition, the memory 2 uses the clock signals without modification, or uses signals corresponding to ½ of the frequency of the clock signals. Therefore, the clock signals which are supplied to the memory 2 cause RF signals radiated to the outside. Further, they are overlapped with the RF signals of the crystal oscillator CT1, with the result that the level thereof is increased.

Referring to FIG. 3, a curve A indicates the intensity of the RF signals from the crystal oscillator CT1, and a curve B indicates the intensity of the RF signals from the memory 2. Meanwhile, the total RF signals which are radiated from around the microprocessor 1 is represented by a curve C which is the sum addition of the curve A and the curve B.

If such a crystal oscillator is applied to a satellite broadcasting receiver or a CATV receiver which processes RF signals, the radiated noise from the crystal oscillating terminal and the radiating noise from the memory affect the adjacent circuits.

SUMMARY OF THE INVENTION

The present invention is intended to overcome the above described disadvantages of the conventional technique.

Therefore it is the object of the present invention to provide an apparatus having a radiated noise damping means for controlling power appliances, in which a simple oscillation amount damping means is installed to a crystal oscillator terminal and to the existing microprocessor, so that the RF signals radiated from peripheral circuits such as a crystal oscillator terminal and a memory can be reduced, thereby minimizing the adverse influence of the radiated noise.

In achieving the above object, the apparatus of the present invention is characterized in that a damping means is installed on a crystal oscillator connected to an external terminal of a microprocessor so as to damp the oscillation level of the crystal oscillator.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 4:
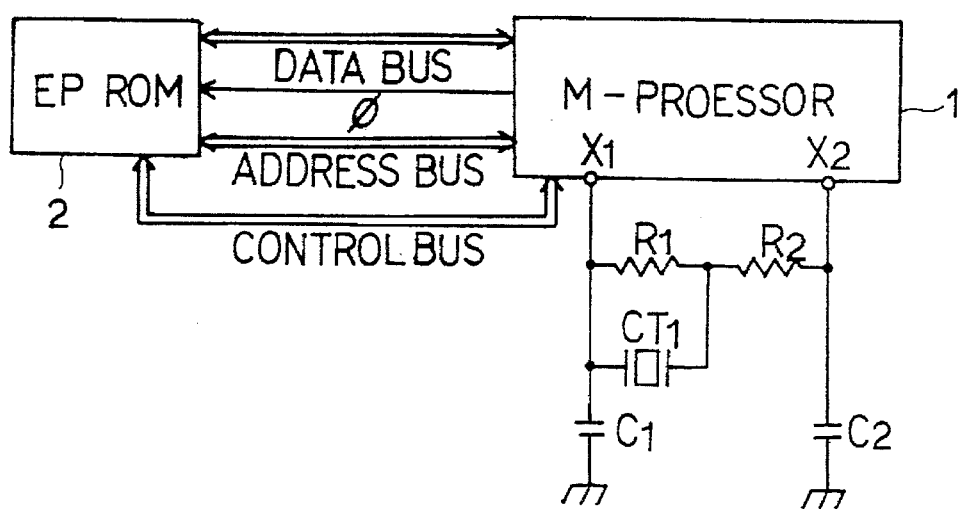
FIG. 4 illustrates the constitution of the apparatus according to the present invention.

FIG. 4 illustrates the constitution of the apparatus according to the present invention.

As shown in this drawing, a first external terminal X1 of a microprocessor 1 is connected to a first terminal of a level resistor R1 and to a first terminal of a crystal oscillator CT1 as well as to a first terminal of a first capacitor C1, while a second terminal of the first capacitor C1 is grounded.

Meanwhile, a second external terminal X2 of the microprocessor 1 is connected to a first terminal of a second capacitor C2 and to a first terminal of damping resistor R2, while a second terminal of the second capacitor C2 is grounded.

Further, a second terminal of the level resistor R1, a second terminal of the damping resistor R2 and a second terminal of the crystal oscillator CT1 are connected together.

Now the apparatus of the present invention constituted as above will be described as to its operation and effects.

The oscillation signals which appear on the external terminals X1 and X2 of the microprocessor 1 are determined by an RLC serial equivalence circuit of the crystal oscillator CT1 and the level resistor R1 which is coupled to the RLC equivalence circuit in parallel therewith.

The generated oscillation signals are supplied through the damping resistor R2 to the external terminals X1 and X2 of the microprocessor 1, and therefore, the level of the oscillation signals can be damped as much as desired by properly selecting the value of the damping resistor R2. Here, the capacitors C1 and C2 are for bypassing the noise.

Figure 1:
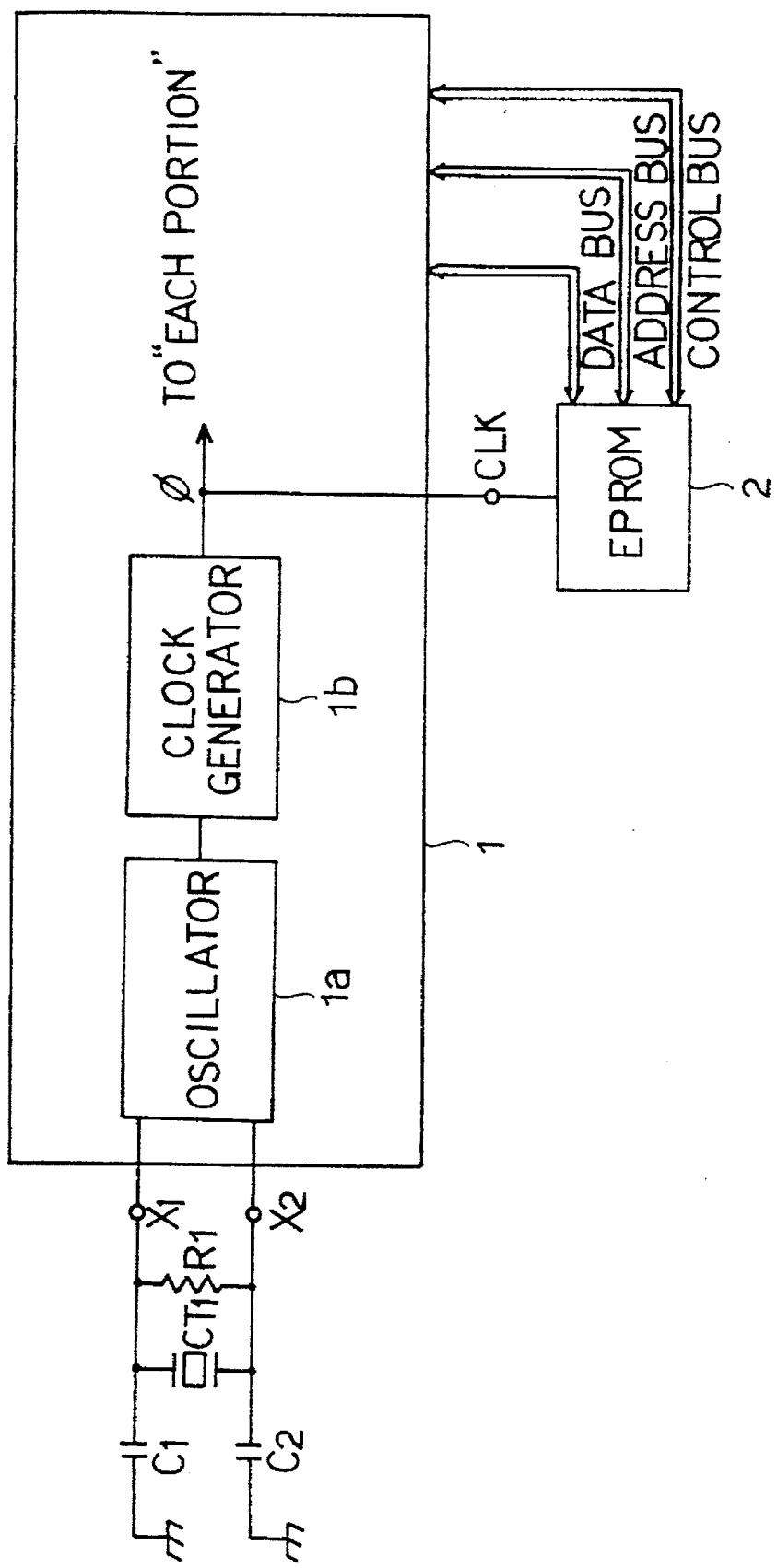
FIG. 1 illustrates a conventional apparatus for controlling power appliances.
Figure 2:
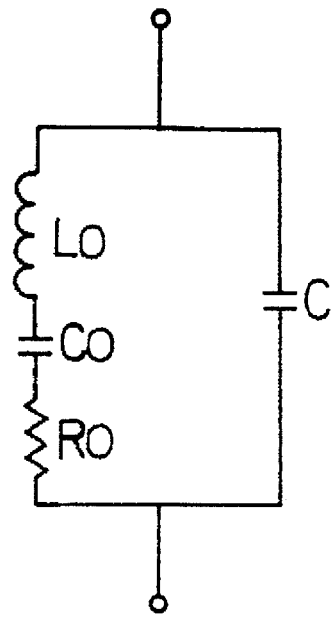
FIG. 2A is an equivalence circuit for the crystal oscillating terminal.
FIG. 2B is an equivalence circuit of the crystal oscillating terminal.
Figure 2:
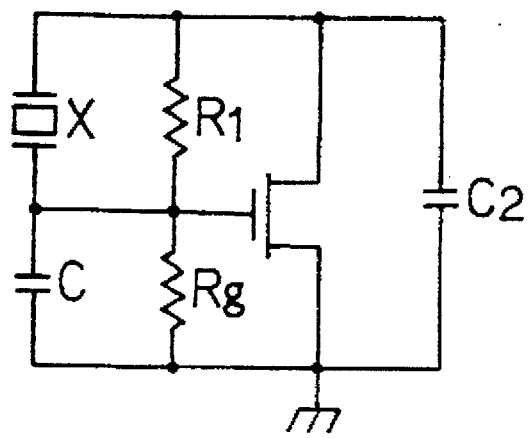
Figure 3:
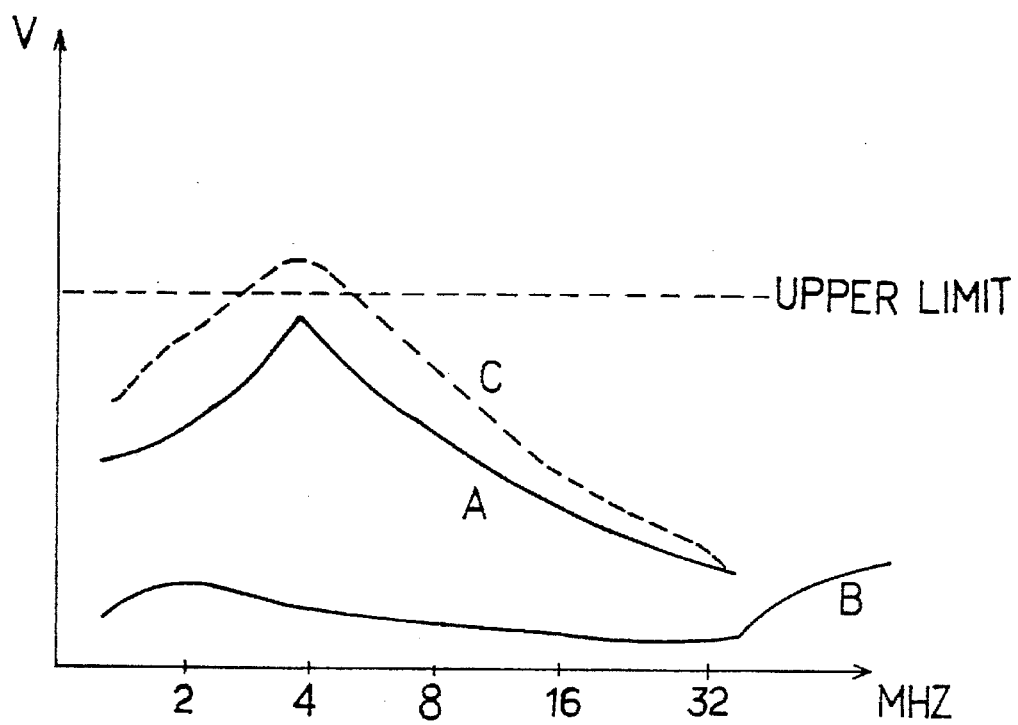
FIG. 3 is a graphical illustration showing the intensities of the radiated electromagnetic waves from the crystal oscillating terminal and the memory device in the conventional apparatus.
Figure 5:
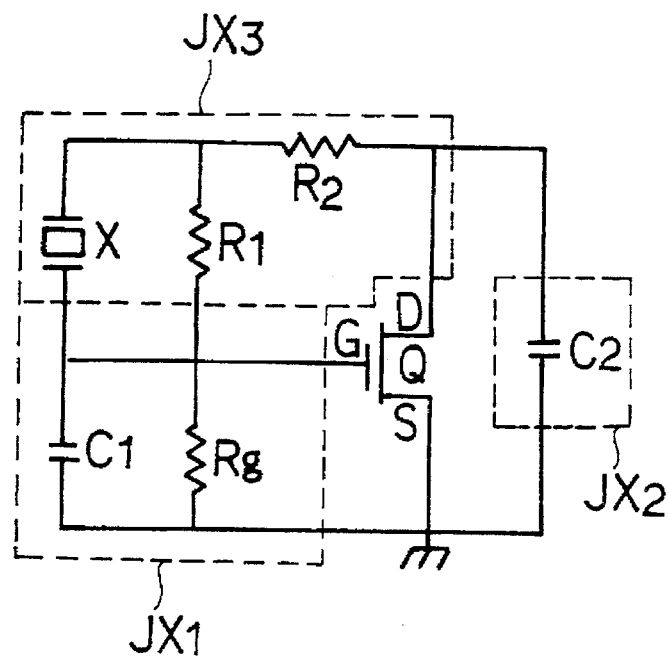
FIG. 5 illustrates a detailed circuit of the crystal oscillating terminal according to the present invention.

In order to show the operation of the oscillating circuit 1a of the microprocessor 1 in more detail, FIG. 5 illustrates a detail circuit in which the damping resistor R2 is added to the apparatus of the present invention. In this circuit, a crystal oscillator X is used instead of the coil L like in FIG. 2B. In this circuit, the damping resistor R2 is used for reducing the intensity of the signals which are fed back from a drain D to a gate G of a field effect transistor Q.

Now the effect of damping the intensity of the fed-back signals by the damping resistor R2 will be described.

Figure 6:
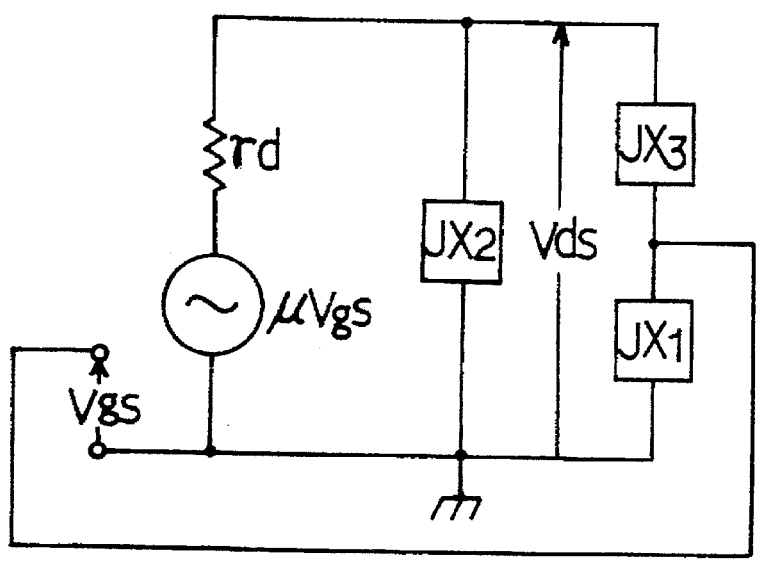
FIG. 6 illustrates an equivalence circuit in which a small signal model is applied to the crystal oscillating terminal of the present invention.

FIG. 6 illustrates an equivalence circuit in which a small signal model is applied to the crystal oscillating terminal of the present invention.

It will be assumed that the impedance of a biasing section consisting of the capacitor C1 and a resistor Rg is indicated by jx1, the impedance of a feed-back section consisting of the crystal oscillator X and the resistors R1 and R2 is indicated by jx3, and the impedance of an output section consisting of the capacitor C2 is indicated by jx2. Then a part of the output signals is fed back through jx3 into the input terminal. Owing to this feed-back, oscillations occur, and in accordance of the intensity of the oscillations, the level of the oscillated signals is increased. Referring of FIG. 6, the feed-back rate $\beta$ can be obtained as follows.

$$\beta = \frac{Vgs}{Vds} = \frac{X1}{X1-X3} \left( \gamma - Vgs = Vds \cdot \frac{jX1}{jX1+jX3} \right) \quad (1)$$

where Vgs represents the gate-source voltage, and Vds represents the drain-source voltage.

As shown in the above formula, the damping resistor R2 is added to X3, the value of X3 is increased, and therefore, the feed-back rate $\beta$ is decreased. If the feed-back rate is decreased, the output of the oscillating circuit 1a is reduced, but it can be made to come within the standard range by properly selecting the value of the damping resistor R2. At the same time, the intensity of the oscillation signals which are fed back to the crystal oscillator CT1 of the microprocessor 1 can be reduced. Therefore, even if an overlapping with the RF signals from the memory 2 occurs, the overlapping can be reduced a range in which the peripheral circuits are not affected.

Figure 7:
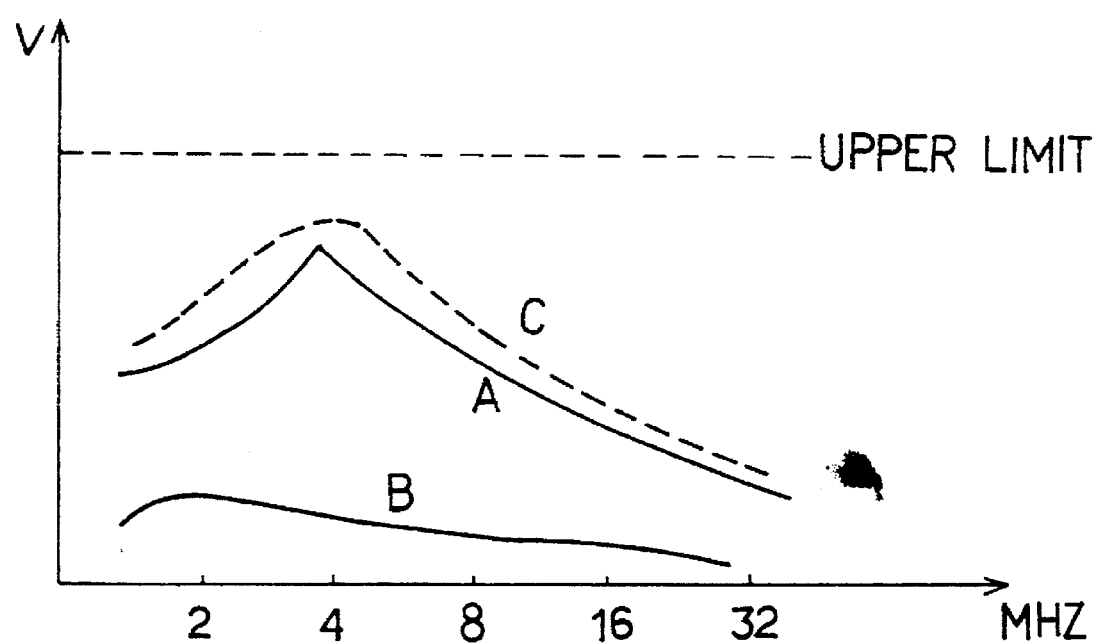
FIG. 7 is a graphical illustration showing the intensities of the radiated electromagnetic waves from the crystal oscillating terminal and the memory device in the present invention.

As can be seen from FIG. 7, the level of the RF signals which are generated from the crystal oscillating terminal is reduced by the damping resistor R2. Therefore, even if the mentioned RF signals are overlapped with the RF signals from the memory, the adjacent circuits are not affected.

According to the present invention as described above, a damping resistor is installed on the crystal oscillating terminal, so that the levels of the RF signals radiated from the crystal oscillating terminal and the memory can be reduced. Consequently, there can be prevented the adverse influence by radiating noise of the crystal oscillating terminal to the peripheral circits in a CATV or a satellite broadcasting apparatus in which there is used RF signal processing sections of microprocesors.

What is claimed is:

1. An apparatus for controlling power appliances, having a microprocessor driving an external crystal, generating clock signals and operating in accordance with said clock signals, the apparatus comprising:

an oscillating means installed within said microprocessor for driving said external crystal and generating oscillating signals;

a clock signal generating means installed within said microprocessor, for receiving said oscillating signals and outputting said clock signals; and a damping means installed between said oscillating means and said external crystal for damping signals outputted from said external crystal and applying said damped signals to said oscillating means.

2. The apparatus as claimed in claim 1, wherein said damping means is connected in series with said external crystal.

3. The apparatus as claimed in claim 1 wherein said damping means consists of a resistor.

* * * * *